United States Patent [19]
O'Connor, III

[11] 3,838,300
[45] Sept. 24, 1974

[54] BRUSH HOLDER FOR PORTABLE HAND TOOLS

[75] Inventor: William Harvey O'Connor, III, Fayetteville, N.C.

[73] Assignee: The Black and Decker Manufacturing Company, Towson, Md.

[22] Filed: Aug. 27, 1973

[21] Appl. No.: 391,531

[52] U.S. Cl.................................... 310/239, 310/50
[51] Int. Cl............................................ H01r 39/40
[58] Field of Search........................ 310/47, 50, 239

[56] References Cited
UNITED STATES PATENTS
| | | | |
|---|---|---|---|
| 3,430,084 | 2/1969 | Hall et al. | 310/50 |
| 3,431,445 | 3/1969 | Petersen et al. | 310/239 |
| 3,671,699 | 6/1972 | Matthews | 310/50 X |

Primary Examiner—A. D. Pellinen
Attorney, Agent, or Firm—Joseph R. Slotnik; Leonard Bloom; Edward D. Murphy

[57] ABSTRACT

An electrically operated portable tool including a housing enclosing a motor including a stationary field and a rotatable armature. The housing includes a rear bridge supporting one end of an armature shaft and including open slots for receiving brush holders, the latter holding carbon brushes engaging a commutator which is part of the armature. The brush holders are retained in place by a holder which is integral with a rear butt section of the housing, thereby eliminating separate brush assembly retention screws and preventing accidental dislodgment of the brush assemblies as well as orienting and maintaining the brush assemblies in their assembled operative positions.

6 Claims, 5 Drawing Figures

PATENTED SEP 24 1974　　3,838,300
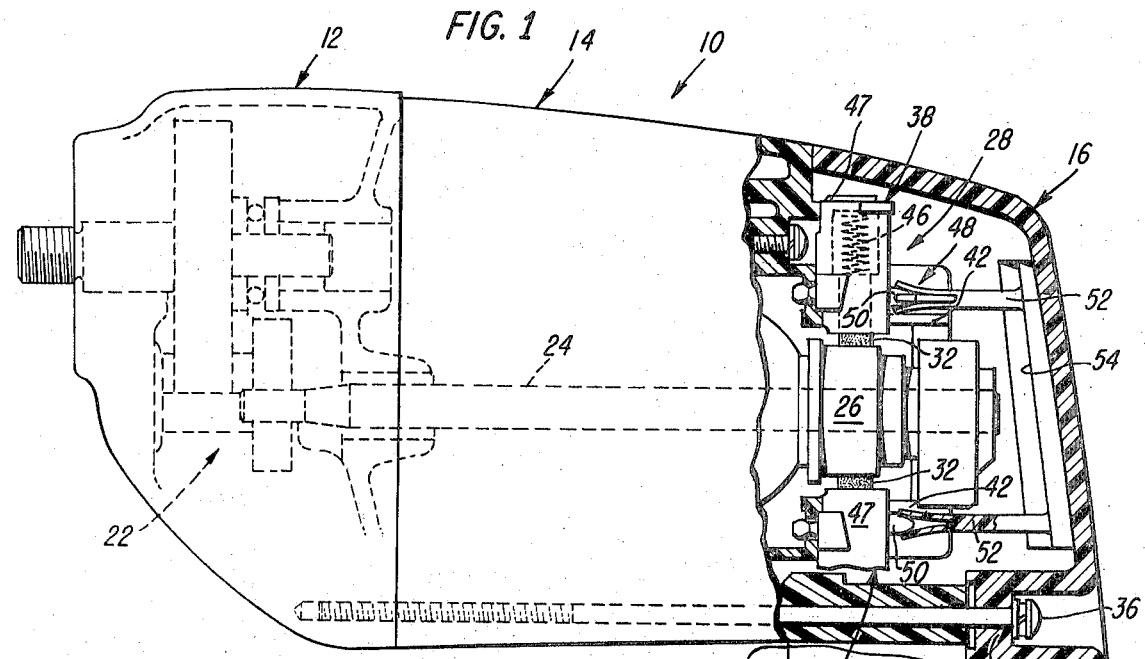
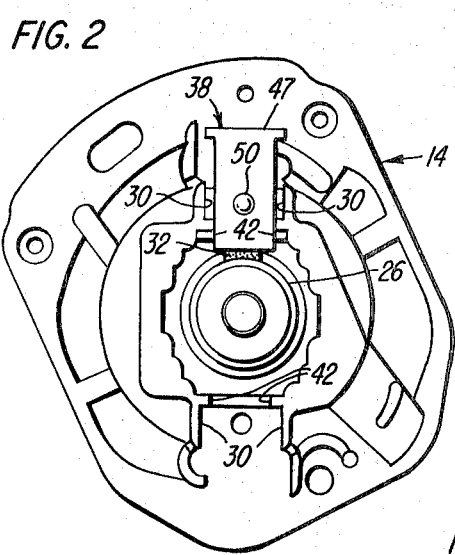
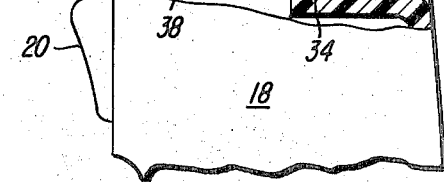
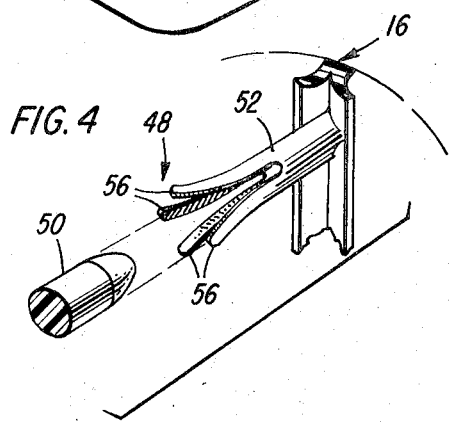
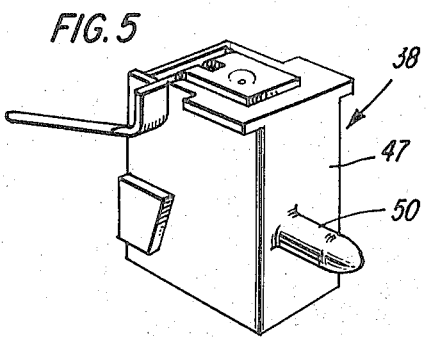

BRUSH HOLDER FOR PORTABLE HAND TOOLS

BACKGROUND OF THE INVENTION

This invention relates generally to electrically operated, portable hand tools such as electric drills, jig saws and the like and particularly concerns novel means for ensuring proper securement and orientation, after replacement and during assembly of carbon brush assemblies in relation to the commutator section of the armature of such devices.

SUMMARY OF THE INVENTION

A primary object of the invention is to provide a novel brush holder in a portable electric tool in which the brushes are readily installed and removed due to guide slot means incorporated on a commutator housing; the commutator housing being an integral part of a forward housing section which has detachably mounted thereon a housing butt section and in which the brush assemblies, when installed in an operative position are engaged by fastener means in which a part thereof is integral with the brush holders, while another part is integral on the housing butt section; the assembling of the housing sections resulting in proper operative orientation and fixing of the brush assemblies and preventing accidental dislodgement of the brush assemblies during normal use of the tool.

These together with other and more specific objects and advantages of the invention will become apparent from the following description of an exemplary embodiment when taken in conjunction with the drawing forming a part thereof, in which:

BRIEF DESCRIPTION OF THE DRAWING

FIG. 1 is a fragmentary longitudinal sectional view of a tool incorporating the invention;

FIG. 2 is a rear elevational view of the commutator housing section and showing one brush holder assembly in its installed relation and one brush holder assembly removed to show details of the integral guide slots on the commutator housing;

FIG. 3 is a fragmentary sectional view showing details of engaged fastener means between a brush holder assembly and the housing butt section;

FIG. 4 is a fragmentary elevational view showing a female fastener element integral with the inner surface of the housing butt section of the tool; and FIG. 5 is a fragmentary perspective view of one of the brush assemblies showing the male fastener element formed on the brush holder.

DESCRIPTION OF THE PREFERRED EMBODIMENT

The novel improvement can be incorporated in all types of electrical power hand tools such as drills, sanders, jig saws and the like and where such tools have a self-contained power source as well as those activated by an external power source.

The electrical circuitry including the armature, control switch, field coil, armature, commutator, brush assemblies, etc., are conventional and are of the general character disclosed in United States Letters Patent to Sheps, et al. U.S. Pat. No. 3,432,703 issued Mar. 11, 1969.

Referring to FIG. 1 in detail, the power unit of a portable hand tool is indicated generally at 10 and comprises a forward metal front section 12, a forward molded plastic housing section 14 and a rear housing butt section 16. In the illustrated tool, the butt section includes a piston grip 18 in which a control switch 20 of a control circuit is mounted. The front section 12 incorporates the usual transmission assembly 22 operatively connected to an armature shaft 24 which includes a rear commutator portion 26.

The housing section 14 includes a rearwardly projecting bridge 28 including diametrically-opposed slots 30 through which diametrically-opposed brushes 32 are spring-urged. The housing butt section 16 includes suitably conformed bosses 34 through which machine screws 36 (only one shown) extend and engage in cooperating tapped portions of the front housing section 12. The machine screws hold housing sections in separable, assembled relation and, as will become apparent, function to retain the brush assemblies 38 in an assembled and operative position in the assembled tool as well as permitting ready disassembly for replacement of components, brush assemblies, etc.

The housing bridge 28 has integrally molded therewith rearwardly and upwardly opening guide slot means 30 which freely receive a respective brush assembly 38 and/or permits its removal and replacement. The slot means comprises a pair of spaced walls flanking the floor of slots 30 and have lower ribs 42 which engage and orient the lower edge of the brush assembly housing.

The brush assemblies 38 each comprise a graphite brush element 32 urged by spring 46 outwardly of a plastic casing 47 (preferably but not necessarily) of rectangular cross section.

Indicated generally at 48 is separable fastener means which comprises male-and-female cooperating portions on the brush holder 47 and on the inner surface of the housing butt section. Although the male portion 50 of the fastener means 48 is illustrated as being formed integral with holder 47 and the female portion 52 is formed on the inner surface of the butt section, the sex of the cooperating fastener portions can be reversed.

The male portion 50 comprises a projecting tab (preferably having a tapered terminal end) and the female portion 52 comprises an integral projecting element extending from the inner surface 54 of the housing butt section 16. The projection 52 includes deformable spaced finger elements 56 which removably receive a male portion 50 therein in gripping relation as seen in FIG. 1.

The parts are so constructed and arranged (as observed in FIG. 1) so that when the brush assemblies 38 are in position, the screws 36, after being run home, will cause the projections 50 to be gripped by the finger elements 54. The arrangement eliminates separate mechanical fasteners for the brush assemblies with the attendant danger of becoming loose due to vibration of the tool during use, and the costs and time required to install or replace such screws. When the tool is assembled, the separable fastener means 48 prevents accidental dislodgment of the brush assemblies in their operative positions in the guide slot means 40 relative to the armature commutator.

In addition, it will be appreciated that the inventive cooperable means 48 on the brush holder 47 and on the housing butt section 16 can be used to stabilize the brush holder when other fastener means is used to retain these brush holders in position.

Furthermore, it will be understood that other deformable or deflectable means can be used, in accordance with this invention, to secure or stabilize the brush holders 47.

I claim:

1. In an electrically powered portable tool of the type including a housing having a forward section enclosing a motor having an armature journaled for rotation therein, said armature having a rear commutator, a pair of brush assemblies each including a slidable carbon brush, said housing including a bridge enclosing the commutator and having recesses removably receiving said brush assemblies and aligning said brushes with said commutator, said housing including a butt section overlying and enclosing said bridge; means connecting the forward and butt section in assembled relation; the improvement wherein said brush assemblies and housing butt section include axially-facing, separable fastening means integral therewith and said fastening means being engaged in a direction generally parallel to the axis of said armature when the butt and forward housing sections are assembled to retain said brush assemblies in said bridge.

2. The structure s claimed in claim 1 in which said separable fastening means as male-and-female separable fastening portions.

3. In an electrically powered portable tool of the type including a housing enclosing a motor having an armature journaled for rotation therein, said armature having a rear commutator, a pair of brush assemblies each including a slidable carbon brush, said housing including a bridge enclosing the commutator and having recesses removably receiving said brush assemblies and aligning said brushes with said commutator, said housing including a butt section overlying and enclosing said bridge; means connecting the forward and butt section in assembled relation; the improvement wherein said brush assemblies and housing butt section include male-and-female separable fastening portions integral therewith and engageable when the butt end forward housing sections are assembled to retain said brush assemblies in said bridge; said male-and-female separable fastening portions comprising a male tab projecting rearwardly from the brush assemblies and a flexible female socket on the inner surface of said housing butt section.

4. The structure as claimed in claim 3 in which said female socket comprises at least a pair of deformable finger elements embracingly engageable on said male tab.

5. The structure as claimed in claim 4 in which said butt section and deformable finger elements are integrally molded.

6. The structure as claimed in claim 3 in which said brush assemblies comprise a molded plastic housing in which said male tab is an integral molded part thereof.

* * * * *

UNITED STATES PATENT OFFICE
CERTIFICATE OF CORRECTION

Patent No. 3,838,300   Dated September 24, 1974

Inventor(s) William Harvey O'Connor, III

It is certified that error appears in the above-identified patent and that said Letters Patent are hereby corrected as shown below:

Column 3, line 24, "s" should read --as--.

Column 3, line 25, "as" should read --comprises--.

Signed and sealed this 17th day of December 1974.

(SEAL)
Attest:

McCOY M. GIBSON JR.
Attesting Officer

C. MARSHALL DANN
Commissioner of Patents